Patented Apr. 9, 1940

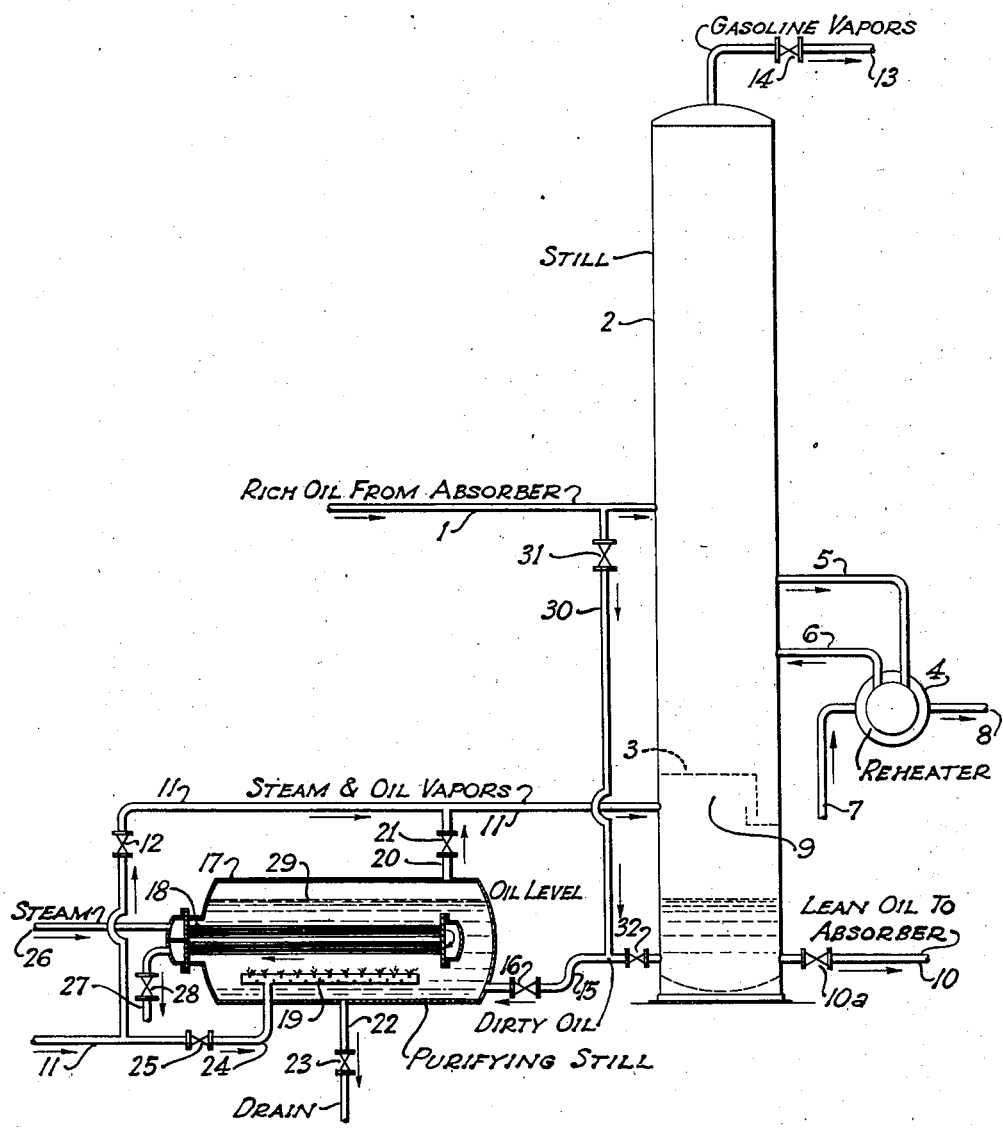

2,196,878

UNITED STATES PATENT OFFICE 2,196,878

PROCESS OF PURIFYING ABSORBENT MENSTRUUMS

William A. Stover, Tulsa, Okla., assignor to Petroleum Engineering, Incorporated, Tulsa, Okla., a corporation of Delaware Application October 25, 1937, Serial No. 170,981

6 Claims. (Cl. 196—8)

This invention relates to a process for purifying and reclaiming absorption menstruums and particularly to a continuous process of purifying and reclaiming menstruums used in the absorption of desirable constituents from gases such as natural gas, casinghead gas, refinery gas, coal gases and the like.

In the conventional absorption process for the recovery of desirable constituents from gases a hydrocarbon absorption menstruum, generally termed "lean oil," is circulated in contact with gas or vapors to absorb therefrom the desired constituents. The absorbent containing the absorbed constituents and termed "rich oil," is then introduced into a still and the absorbed constituents stripped from the absorbent by contact with a heating medium such as open steam, and the absorbent so stripped is cooled and returned to the absorption step of the process.

In the course of the repeated contacts of the lean oil with fresh supplies of incoming gas, the oil will become contaminated with foreign matter and relatively high boiling materials carried by the gas. Since these contaminating materials are not vaporizable at the temperature of the stripping of the rich oil, they will concentrate in the oil and eventually reduce the absorption efficiency of the oil and the foreign matter may also deposit on the walls of heat exchanger tubes and like equipment, through which the oil circulates in the conventional process, and reduce the efficiency of such equipment for the purposes for which the equipment is intended.

Heretofore, absorbents, which have become contaminated by heavy impurities, were cleaned by removing them from the absorption cycle and subjecting the entire body of absorbent or at least a portion thereof to distillation under conditions whereby the absorbent is vaporized and the impurities left as unvaporized residue in the still. Such a method causes disruption of the absorption operation during the period when the dirty absorbent is removed from the system and requires a complete distillation unit for the purification of the absorbent, involving added expense for the additional equipment and for the steam or other heating medium for vaporizing the absorbent and for water or other cooling medium to condense and cool the vaporized absorbent.

This invention contemplates the purification of absorbent menstruum without their removal from the absorption system, and with very little additional equipment and at substantially no increase in the cost over that of distilling the rich oil in the conventional way.

This invention contemplates the continuous diversion of a relatively minor portion of the dirty absorbent from the main stream thereof, subjecting the diverted portion to direct intimate contact with the same heating medium utilized for stripping the enriched absorbent, the quantity of heating medium being sufficient to vaporize the absorbent and to separate the absorbent vapors from the foreign matter, and then bringing the heating medium and the absorbent vapors carried thereby into stripping contact with the main body of absorbent containing constituents recovered from the gases previously contacted by the absorbent, and thereby returning the diverted and purified absorbent to the main body thereof.

By the continuous process of this invention only a very small portion, ranging from about one-half to three percent of the absorbent, need be treated to effect continuous purification of the total absorbent. No additional quantity of heating medium is required, since the heating medium passes directly from the purifying zone into contact with the main body of rich oil and the heat lost therefrom in vaporizing the small portion of absorbent is largely recovered through condensation of the vaporized absorbent by contact with the rich oil.

The heating medium generally preferred for the purpose of this invention is steam, although other heating medium may be used.

Therefore, a principal object of this invention is to provide an efficient and economical method for continuously purifying absorption menstruums.

Another object is to purify and reclaim dirty absorbent menstruums by means of the same heating medium which is utilized for stripping the rich oil.

A specific object is to purify dirty absorbent menstruums by continuously distilling a relatively minor portion of the main body of such menstruums by means of steam and utilizing the same steam and the absorbent vapors evaporated thereby to strip absorbed constituents from the main body of the absorbent menstruum.

Another object is to continuously purify dirty absorbent menstruums without interrupting the absorption-distillation cycle of a conventional absorption process.

Other objects and advantages of my new process will be apparent from the following detailed description in conjunction with the accompanying drawing, which diagrammatically illustrates a form of apparatus suitable for successfully practicing the process steps of this invention.

Referring to the drawing:

Rich oil consisting of a conventional hydrocarbon absorbent menstruum and gasoline constituents recovered in a conventional absorption step (not shown) is introduced through a pipe 1 into a still 2. Still 2 is of conventional design and may be fitted with bubble trays over which the rich oil flows into contact with a stripping medium such as steam. Only the lowermost tray 3 is shown in the drawing, and the absorbent, which has descended through the still to this point, will have been denuded of absorbed constituents by the time it has reached this tray. A conventional reheater 4 is shown at one side of still 2, its purpose being to supply additional stripping heat to the descending absorbent, which leaves still 2 through a pipe 5 entering one section of reheater 4 and, after passing through the reheater returning through a pipe 6 into the still. The additional heat is supplied to the absorbent by steam or other heating medium which is introduced into reheater 4 through a pipe 7 and flows therethrough in indirect heat exchange relationship with the absorbent, and discharges therefrom through a pipe 8. The lowermost portion of still 2 below tray 3 comprises an accumulator 9 in which the absorbent now completely stripped of absorbed constituents collects in a pool. The stripped absorbent, termed "lean oil," is withdrawn from accumulator 9 through pipe 10, having a valve 10a mounted therein, and returned to the absorption step of the process for contact with fresh supplies of gas. Open steam is supplied through a pipe 11, in which is mounted a valve 12, and introduced into still 2 below tray 3. The steam flows upward in still 2 in intimate contact with the downflowing rich oil and strips the absorbed constituents therefrom. The stripped vapors and steam then continue upward to the upper portion of still 2 from which these materials are discharged through a pipe 13, having a valve 14 mounted therein, to a conventional condensing and fractionating system, not shown.

The operation, above described, is entirely conventional up to this point. The operation to be described hereinafter includes steps departing from conventional practice, which constitute the novel features of this invention.

The lean oil which collects in accumulator 9 will contain the various impurities picked by the absorbent from the gases contacted in the absorption step of the process. These impurities generally include solid matter, such as dirt, rust and scale, and high boiling materials such as heavy constituents of crude oils, tarry matter, waxes, gums and the like, and must be removed from the oil in order that it may maintain its maximum absorption efficiency and in order to prevent deposit of these materials in the pipes, heat exchanger tubes and other parts of the equipment, which would otherwise become dirty or clogged with these impurities and as a result, operate at reduced efficiency.

Accordingly, a quantity of dirty oil, in an amount ranging, generally, from one-half percent to three percent of the total volume of clean oil circulated through the absorption system, is continuously withdrawn from accumulator 9 and introduced through a pipe 15, in which is mounted a valve 16, into a purifying still 17.

Purifying still 17, as diagrammatically shown in the drawing, is a horizontally arranged tank within which is mounted a heating coil 18 and a perforated steam distributing header 19. A pipe 20, equipped with a valve 21, leads from the upper portion, or vapor space of purifying still 17, and connects into pipe 11 at a point between valve 12 and the connection of pipe 11 into still 2. A pipe 22, having a valve 23 therein, is connected to the lower portion of still 17 and serves as a drain pipe therefor. A branch pipe 24, in which is mounted a valve 25, is connected into steam pipe 11 at a point in advance of valve 12 in pipe 11, and leads into distributing header 19. A steam supply pipe 26 is connected into heating coil 18, which is equipped with a condensate discharge pipe 27, in which is mounted a valve 28.

In initiating the purifying operation, a relatively large quantity of the dirty lean oil from accumulator 9 is introduced into still 17 and thereafter only as much additional oil is transferred from accumulator 9 to still 17 as is necessary to maintain a constant level therein. The level, indicated at 29, is substantially the same height as that maintained in accumulator 9, and once the process is in operation, these levels will remain substantially unchanged, only as much dirty oil being permitted to flow from accumulator 9 through pipe 15 into still 17 as is withdrawn from still 17 in the form of vapors through pipe 20 or as unvaporized impurities through pipe 22.

When sufficient dirty oil has been accumulated in still 17 to begin the purifying operation valves 12 and 25 are adjusted to divert a quantity of the stripping steam from its direct route through pipe 11 to still 2, through pipe 24 into header 19, whence the steam discharges through the perforations in header 19 directly into the body of dirty oil in still 17. A sufficient volume of steam is thus introduced into still 17 to vaporize a quantity of the oil equal to the quantity to be continuously supplied to still 17 from accumulator 9, less the quantity of undesirable impurities carried by the oil.

The resulting oil vapors plus the steam introduced into still 17 are then discharged through pipe 20 into pipe 11 and thence into still 2. The steam will then perform its normal function of agitating and stripping the rich oil introduced into still 2 through pipe 1. The oil vapors entering from still 17 will assist the steam in this respect and will be condensed by the downflowing stream of rich oil. The heat of vaporization thus released in condensing the oil vapors will aid in the stripping of the rich oil and will offset to a great extent the heat lost by the steam in vaporizing the oil in still 17. The quantity of oil vapors thus condensed and reunited with the main stream of absorption oil, will, of course, be free of impurities and will reduce the quantity of impurities in the main stream of absorbent in proportion to the proportion which it bears to the main stream of oil.

The continuous diversion and distillation of a portion of the absorbent menstruum will thus continuously purify the absorption oil and maintain its absorption efficiency at a maximum while at the same time, removing the impurities from the system and eliminating the detrimental effects of such impurities on the efficiency of the absorption and distillation equipment.

As the purification continues in still 17, the impurities will be concentrated in the lower portion of the still from which these impurities may be withdrawn at desired intervals through pipe 22 and valve 23. The withdrawal of impurities may be continuous if desired, but as the total quantity thereof is very small, it is usually preferable to allow them to accumulate in the still for an extended period of time before flushing them from the system.

The temperature maintained in still 17 will be determined by the boiling range of the absorbent menstruum and the boiling point of the heavy impurities to be withdrawn as residue. The temperature maintained is that at which the absorbent menstruum itself will be vaporized by the steam to be used in the stripping of the rich oil, while leaving the higher boiling impurities in unvaporized condition in the still 17.

The pressure maintained in still 17 is preferably the same as that maintained in still 2, though not necessarily so. Any desired pressure may be applied in stills 2 and 17 by suitable manipulation of valves 14 and 21 respectively.

The quantity of steam diverted from pipe 11 through still 17 may be varied depending upon the temperature conditions desired in still 17 and the amount of absorbent menstruum to be vaporized in still 17.

In order to assist the vaporization of absorbent in still 17, additional heat may be supplied to the body of oil therein by passing high temperature steam from pipe 26 through heating coil 18 thence through pipe 27 and valve 28 to any disposal means desired.

The proportion of the total absorbent which is subjected to the purifying step may be readily calculated by substitution of the proper values in the following formula:

$$\frac{S}{O} = \frac{P-M}{M}$$

in which
S = mols per hour of steam;
O = mols per hour of oil carried by the steam;
P = still pressure-pounds absolute;
M = vapor pressure of purifying still bottoms at still temperature.

In one example, proper values for substitution in the above formula may be obtained from the following data based on conventional rich oil stripping practice:

| | |
|---|---|
| Lean oil circulation rate | 100 gals. per minute |
| Molecular weight of oil | 170 |
| A. P. I. gravity of oil | 40°—6.87 lbs. per gallon |
| Boiling range of oil | 350° to 475° F. |
| Mols of oil circulated per hour | 242.5 |
| Steam for stripping rich oil | 0.15 lb. per gal. lean oil |
| Total steam required | 900 lbs. per hour |
| Total steam required | 50 mols per hour |
| Vapor pressure of purifying still residue | 2 lbs. at 350° F. |
| Purifying still temperature | 350° F. |
| Purifying still pressure | 50 lbs. absolute |

From the above data, the following formula values are obtained: S=50; O=?; P=50; M=2.
Substituting these values in the formula:

$$\frac{50}{O} = \frac{50-2}{2}$$

from which, O=2.08 mols of oil per hour carried by the steam from the purifying still. 2.08 mols per hour equals 0.85% of the total lean oil circulation treated in the purifying still and this percentage is equivalent to 51 gallons per hour.

From these calculations it will be seen that in the above example, the quantity of steam required for stripping the rich oil in still 2 will also distill 51 gallons per hour of the oil to be purified before the steam performs its normal stripping function in still 2.

The particular distillation conditions in purifying still 17 are such as to vaporize substantially all of the constituents of the absorbent menstruum within its normal boiling range, leaving as residue substantially only those higher boiling impurities which have been absorbed by the menstruum from the gases in the absorption process, the vapor pressure of the residue being the control condition for the purifying operation.

As it is necessary to treat only a very small proportion of the total oil circulated, if the treatment is continuous, to keep the menstruum in relatively clean condition, it will be seen from the foregoing description and calculations, that by routing through still 17 the normal quantity of steam required for the stripping operation in still 2, this quantity of steam will continuously distill a quantity of menstruum sufficient to purify the entire body thereof without additional cost for heating and distillation utilities and with very little additional equipment. At the same time, there is no interruption of the absorption oil cycle, since in the above example, 100 gallons per minute of lean oil will be continuously withdrawn through pipe 10 and returned to the absorption step.

If it is desired to increase the distillation temperature in purifying still 17, without increasing the quantity of open steam which is normally required in still 2, additional heat may be supplied by passing high temperature steam through heating coil 18. The additional steam required for this purpose is compensated for by a corresponding reduction in the quantity of heat which will then be required in re-heater 4, since higher temperatures in still 17 will be reflected in still 2 and thus correspondingly reduce the amount of additional heating required from re-heater 4. Thus it will be clearly apparent that by the process of this invention, absorbent menstruums may be continuously purified of high boiling impurities by contacting a minor portion of the menstruums continuously with the same heating and stripping medium used in the stripping of the lower boiling absorbed constituents from the main body of the menstruums. And that this is accomplished without additional heating, condensing or distillation costs and with very slight additional equipment expense, thereby providing a highly efficient and economical continuous process for purifying absorbent menstruums.

The proportional part of the absorbent menstruum to be subjected to the continuous purifying operation is variable and will be dependent upon the quantity of impurities in the gases contacted by the menstruum in the absorption operation. If less than the theoretical quantity of menstruum vaporizable by all of the stripping steam need be treated to purify the menstruum, only enough steam for this purpose will be diverted from pipe 11 through still 17, the remainder proceeding directly to still 2. If it is necessary to treat a larger proportion of the menstruum than is theoretically vaporizable by the normal quantity of stripping steam, additional heat for vaporizing the additional quantity of menstruum may be supplied by means of heating coil 18, the additional heat being compensated for by proportionally reducing the heat supplied to still 2 by re-heater 4.

Instead of the horizontal type purifying still shown in the drawing, other forms of stills may be used for this purpose. For example, still 17 may be equipped with a vapor dome to allow the outgoing steam and menstruum vapors to drop mechanically entrained particles of the still residue. Another form of still may comprise a vertically arranged tank fitted with baffles or bubble trays, the dirty menstruum being introduced above the baffles or trays and caused to flow downwardly thereover in contact with upward flowing steam which will vaporize the desired portion of the dirty menstruum and separate the vapors from an unvaporized residue containing the impurities, which will collect in the lower portion of the still and be continuously withdrawn therefrom.

Instead of subjecting a portion of the lean oil from accumulator 9 to the purifying distillation in still 17, an equivalent amount of rich oil may be continuously diverted from the stream thereof flowing through pipe 1 and sent directly to still 17 through a pipe 30, which connects to pipe 15. A valve 31, mounted in pipe 30, may be adjusted to regulate the quantity of rich oil thus diverted and a valve 32, mounted in pipe 15 between the connection of pipe 30 to pipe 15 and the point of exit of pipe 15 from accumulator 9, will be closed to shunt off the flow of lean oil from accumulator 9. In some cases, the oil purified in still 17 may consist partly of lean oil and partly of rich oil, the relative proportions of each being regulated by suitable adjustment of valves 31 and 32.

Various changes and modifications may be made in the particular details of the process of this invention without departing from the scope of the appended claims.

What I claim and desire to secure by Letters Patent is:

1. In the process of stripping absorbed constituents from an absorbent menstruum wherein said menstruum is stripped of said absorbed constituents by direct contact with a vaporous stripping medium, the step of continuously purifying said menstruum which comprises, diverting a minor portion of said menstruum from the main body thereof, passing said stripping medium first into direct contact with said minor portion of said menstruum and second into direct contact with the main body thereof, and adjusting the quantity of said minor portion to such as will be substantially completely vaporized by said direct contact with said stripping medium.

2. In the process of stripping absorbed constituents from an absorption menstruum wherein said menstruum is stripped of said absorbed constituents by direct contact with a vaporous stripping medium, the step of continuously purifying said menstruum which comprises, diverting a minor portion of said menstruum from the main body thereof after the said main body has been stripped of said absorbed constitutents, passing said stripping medium first into direct contact with said minor portion of said menstruum, and second into direct contact with said main body thereof before the same has been stripped of said absorbed constituents, and adjusting the quantity of said minor portion to such as will be substantially completely vaporized by said direct contact with said stripping medium.

3. A process according to claim 1 wherein said minor portion of said menstruum consists of about one-half to about three percent by volume of the total quantity of said absorption menstruum.

4. A process according to claim 1 wherein said minor portion of said menstruum consists of about one-half to about three percent by volume of the total quantity of said absorption menstruum, and wherein said vaporous stripping medium is steam.

5. In the operation of an absorption recovery system in which a distillate absorbent oil is cyclically circulated through an absorber and a stripper, the improvement which comprises dividing the charged oil from the absorber into a major part and minor part, introducing the major part into the stripper, vaporizing the bulk of the minor part with steam, introducing the resulting vapor mixture into the stripper at a point adjacent that from which stripped oil is withdrawn from the stripper and discharging from the absorption recovery system the unvaporized portion of the minor part.

6. In the operation of an absorption recovery system in which a distillate absorbent oil is cyclically circulated through an absorber and a stripper, the improvement which comprises dividing the stripped oil from the stripper into a major part and a minor part, returning the major part to the absorber, vaporizing the bulk of the minor part with steam, introducing the resulting vapor mixture into the stripper at a point adjacent that from which stripped oil is withdrawn from the stripper and discharging from the absorption recovery system the unvaporized portion of the minor part.

WILLIAM A. STOVER.